United States Patent [19]

Minami

[11] 4,331,386
[45] May 25, 1982

[54] ELECTROCHROMIC DISPLAY CELL

[75] Inventor: Yasuo Minami, Nara, Japan

[73] Assignee: Sharp Kabushiki Kaisha, Osaka, Japan

[21] Appl. No.: 143,016

[22] Filed: Apr. 23, 1980

[30] Foreign Application Priority Data

Apr. 28, 1979 [JP] Japan .............................. 54-58630[U]

[51] Int. Cl.³ ................................................ G02F 1/17
[52] U.S. Cl. .................................................... 350/357
[58] Field of Search .......................................... 350/357

[56] References Cited

U.S. PATENT DOCUMENTS 4,192,581 3/1980 Yaguchi et al. ...................... 350/357
4,229,080 10/1980 Take et al. ............................ 350/357

Primary Examiner—James W. Davie
Attorney, Agent, or Firm—Birch, Stewart, Kolasch & Birch

[57] ABSTRACT

An electrochromic display cell includes front and rear glass substrates, a liquid electrolyte disposed between the substrates, and a porous ceramic plate disposed in the liquid electrolyte for providing a white display background. Transparent electrodes are formed on the front glass substrate, and electrochromic display segments are formed on each of the transparent electrodes. The transparent electrodes are formed so as to cover the substantially entire display surface of the electrochromic display cell, and electrically separated from each other by a thin gap. The operator observes the porous ceramic plate through the transparent electrodes over the entire display surface, whereby a uniform white background is provided over the entire display surface.

4 Claims, 8 Drawing Figures

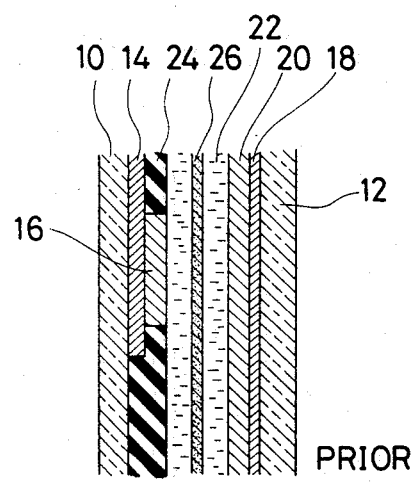
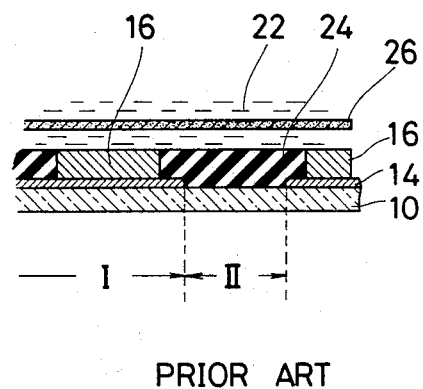
FIG. 1  FIG. 2
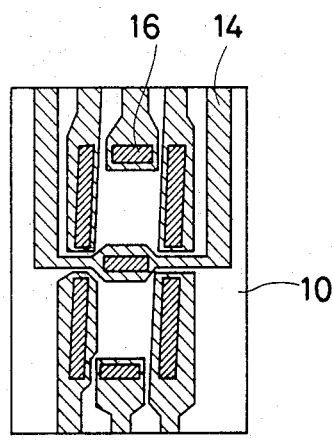
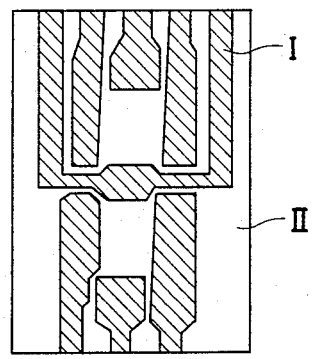
PRIOR ART  PRIOR ART
FIG. 3  FIG. 4

ELECTROCHROMIC DISPLAY CELL

BACKGROUND AND SUMMARY OF THE INVENTION

The present invention relates to an electrochromic display cell and, more particularly, to a novel construction of an electrochromic display cell which ensures a high legibility.

The electrochromic display cell generally comprises transparent electrodes, electrochromic layers formed on the transparent electrodes, and a porous ceramic plate for providing a white background. A typical construction of the electrochromic display cell is disclosed in U.S. Pat. No. 3,944,333 entitled "ELECTROCHROMIC DISPLAY WITH POROUS SEPARATOR" issued on Mar. 16, 1976.

When the electrochromic layer is placed in the coloration condition, the operator recognizes the colored segment. When the electrochromic layer is placed in the bleached condition, the operator observes the porous ceramic plate through the transparent electrode. Since the transparent electrode, in the conventional cell, is formed to accommodate the segment configuration and its lead electrode configuration, there is a color tone difference between the background which is observed through the transparent electrode and the background which is not covered by the transparent electrode. This color tone difference deteriorates the display quality.

Accordingly, an object of the present invention is to provide an electrochromic display cell for ensuring a clean display.

Another object of the present invention is to provide an electrochromic display cell which ensures a uniform background.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, transparent electrodes are formed on a front glass substrate to substantially cover the entire display surface of the electrochromic display cell. Each of the transparent electrodes are separated from each other by a thin gap. Accordingly, the operator observes the porous ceramic plate through the transparent electrode on the substantially entire display surface, whereby a uniform background is observed.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a sectional view of an electrochromic display cell or prior art;

FIG. 2 is a sectional view of an essential part of the electrochromic display cell of FIG. 1;

FIG. 3 is a plan view of a front glass substrate of the electrochromic display cell of FIG. 1;

FIG. 4 is a plan view showing an electrode pattern formed on the front glass substrate of FIG. 3;

DESCRIPTION OF THE PREFERRED EMBODIMENTS

Figure 5:
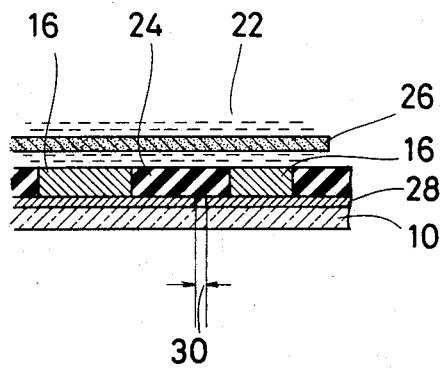
FIG. 5 is a sectional view of an essential part of an embodiment of an electrochromic display cell of the present invention.

FIG. 1 schematically shows a typical construction of an electrochromic display cell of prior art.

The electrochromic display cell generally comprises a front glass substrate 10, a rear glass substrate 12, a transparent electrode 14 formed on the front glass substrate in a desired configuration, and an electrochromic layer 16 formed on the transparent electrode 14. The electrochromic layer 16 is shaped to function as a display segment. The transparent electrode 14 is formed through the use of an evaporation method, and functions as a segment electrode and its lead electrode.

The electrochromic display cell further comprises an electrode 18 formed on the rear glass substrate 12, and another electrochromic layer 20 formed on the electrode 18. The electrode 18 and the electrochromic layer 20 function, in combination, as a counter electrode. A liquid electrolyte 22 is disposed between the front glass substrate 10 and the rear glass substrate 12. An insulator layer 24, is formed on the front glass substrate 10 except the electrochromic layer 16 in order to protect the transparent electrode 14 from the liquid electrolyte 22. The insulator layer 24 must be transparent, and is preferably made of $SiO_2$. A porous ceramic plate 26 is disposed in the liquid electrolyte 22 for providing a white display background.

When a reversible D.C. voltage signal is applied between the transparent electrode 14 and the electrode 18, the electrochromic layers 16 and 20 are colored or bleached. When the electrochromic layer 16 is placed in the coloration state, the operator recognizes a colored segment. When the electrochromic layer 16 is placed in the bleached state, the operator observes the white background through the transparent electrode 14 and the electrochromic layer 16.

The transparent electrode 14, in the conventional cell, is shaped so as to function as a segment electrode and a lead electrode thereof. Accordingly, there is a color tone difference between the background which is observed through the transparent electrode 14 and the background which is not covered by the transparent electrode 14.

FIG. 2 is a sectional view of the electrochromic display cell of FIG. 1 for explaining the above-mentioned color tone difference. Like elements corresponding to those of FIG. 1 are indicated by like numerals.

In FIG. 2, a first section I is covered by the transparent electrode 14. Contrarily, a second section II is not covered by the transparent electrode 14. Accordingly, the color tone is different between the section I and section II. This difference precludes the provision of a uniform white background.

FIG. 3 shows a typical configuration of the transparent electrodes 14 and the electrochromic layers 16 formed on the front glass substrate 10 in the conventional electrochromic display cell of the segmented type.

FIG. 4 shows the color tone difference in the electrochromic display cell of FIG. 3.

FIG. 5 shows an essential part of an embodiment of an electrochromic display cell of the present invention. Like elements corresponding to those of FIG. 1 are indicated by like numerals.

In the electrochromic display cell of the present invention, transparent electrodes 28 are formed on the front glass substrate 10 so as to cover the substantially entire display surface of the electrochromic display cell. Each of the transparent electrodes 28 is separated from each other by thin gaps 30. A preferred width of the thin gap 30 is about 20 through 400 $\mu$m. In this way, the porous ceramic plate 26 is observed through the transparent electrode 28 over the entire display surface of the electrochromic display cell, whereby a uniform white background is provided.

Figure 6:
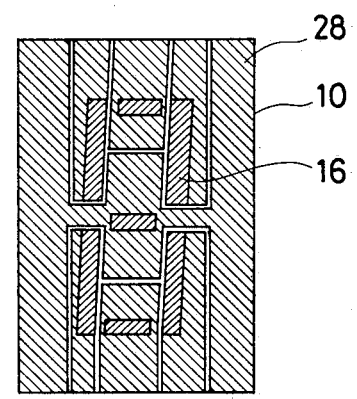
FIG. 6 is a plan view of an embodiment of a front glass substrate included in the electrochromic display cell of FIG. 5.
Figure 7:
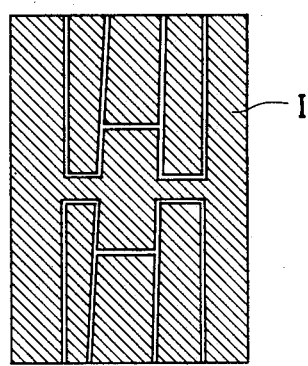
FIG. 7 is a plan view showing an electrode pattern formed on the front glass substrate of FIG. 6.

FIG. 6 shows, in detail, the transparent electrodes 28 and the electrochromic layers 16 formed on the front glass substrate 10 of the electrochromic display cell of the present invention. The operator observes the background covered by the transparent electrodes 28 over the entire display surface as shown in FIG. 7.

Figure 8:
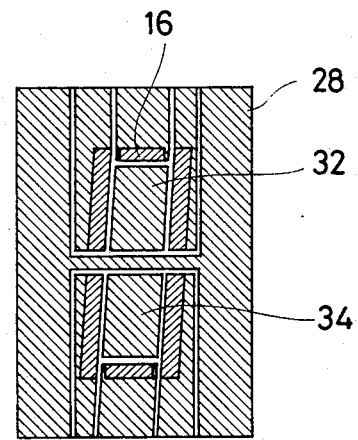
FIG. 8 is a plan view of another embodiment of a front glass substrate included in the electrochromic display cell of FIG. 5.

FIG. 8 shows another embodiment of the transparent electrodes formed on the front glass substrate 10. Like elements corresponding to those of FIG. 6 are indicated by like numerals.

Transparent films 32 and 34, which are not connected to the driver circuit of the electrochromic display cell, are formed on the front glass substrate 10 to provide the uniform background.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electrochromic display cell comprising a front glass substrate, a rear substrate, transparent electrodes formed on the surface of said front glass substrate, electrochromic layers formed on said transparent electrodes, a background creating means disposed between said front glass substrate and said rear substrate in a liquid electrolyte, an insulator layer formed on said front glass substrate in those areas not occupied by said electrochromic layers so as to protect said transparent electrodes from the electrolyte, said transparent electrodes comprising a transparent conductive film formed on substantially the entire display surface of said front glass substrate, said transparent film being interrupted by at least one thin gap formed therein which serves to electrically separate said transparent electrodes.

2. The electrochromic display cell of claim 1, wherein said thin gap has the width of about 20 through 400 $\mu$m.

3. The electrochromic display cell of claims 1 or 2, wherein said background creating means is a porous ceramic plate for providing a white background.

4. The electrochromic display cell of claim 3, wherein said electrochromic layers are segment shaped and formed on said transparent conductive film comprising said transparent electrodes, respectively, each transparent electrode being electrically separated by said thin gap.

* * * * *